(12) United States Patent
Hua et al.

(10) Patent No.: US 7,164,798 B2
(45) Date of Patent: Jan. 16, 2007

(54) LEARNING-BASED AUTOMATIC COMMERCIAL CONTENT DETECTION

(75) Inventors: Xian-Sheng Hua, Beijing (CN); Lie Lu, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 10/368,235

(22) Filed: Feb. 18, 2003

(65) Prior Publication Data

US 2004/0161154 A1    Aug. 19, 2004

(51) Int. Cl.
*G06K 9/72* (2006.01)
*H04H 9/00* (2006.01)

(52) U.S. Cl. ......................... 382/229; 725/22
(58) Field of Classification Search ............ 382/229; 725/22
See application file for complete search history.

(56) References Cited

U.S. PATENT DOCUMENTS

| | | | |
|---|---|---|---|
| 5,442,633 A | 8/1995 | Perkins et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,745,190 A | 4/1998 | Ioka | |
| 5,751,378 A | 5/1998 | Chen et al. | |
| 5,774,593 A | 6/1998 | Zick et al. | |
| 5,801,765 A | 9/1998 | Gotoh et al. | |
| 5,835,163 A | 11/1998 | Liou et al. | |
| 5,884,056 A | 3/1999 | Steele | |
| 5,900,919 A | 5/1999 | Chen et al. | |
| 5,911,008 A | 6/1999 | Niikura et al. | |
| 5,920,360 A | 7/1999 | Coleman, Jr. | |
| 5,959,697 A | 9/1999 | Coleman, Jr. | |
| 5,983,273 A | 11/1999 | White et al. | |
| 5,990,980 A | 11/1999 | Golin | |
| 5,995,095 A | 11/1999 | Ratakonda | |
| 6,047,085 A * | 4/2000 | Sato et al. | 382/165 |
| 6,100,941 A * | 8/2000 | Dimitrova et al. | 348/700 |
| 6,166,735 A | 12/2000 | Dom et al. | |
| 6,462,754 B1 | 10/2002 | Chakraborty et al. | |

(Continued)

FOREIGN PATENT DOCUMENTS

| | | |
|---|---|---|
| EP | 0597450 | 5/1994 |
| EP | 1 168 840 A2 | 1/2002 |
| EP | 1 213 915 A2 | 6/2002 |
| GB | 2 356 080 A | 5/2001 |

OTHER PUBLICATIONS

Zhang et al., "A Hierarchical Organization Scheme for Video Data" Pattern Recognition, Elsevier, Kidlington, GB, vol. 35 No. 11, Nov. 2002, pp. 2381-2387.
"Advanced Digital Video Storage and On-line Retrieval System", Advisor Project, Jun. 30, 2002, retrieved from the Internet: http://advisor.matrasi-tls.fr/DUP_workshop_sheet.pdf.
Bertini et al., "Indexing for Resue of TV News Shots" Pattern Recognition, Elsevier, Kidlington, GB, vol. 35, No. 3, Mar. 2002, pp. 581-591.

(Continued)

*Primary Examiner*—Joseph Mancuso
*Assistant Examiner*—Kathleen Yuan
(74) *Attorney, Agent, or Firm*—Lee & Hayes, PLLC

(57) ABSTRACT

Systems and methods for learning-based automatic commercial content detection are described. In one aspect, program data is divided into multiple segments. The segments are analyzed to determine visual, audio, and context-based feature sets that differentiate commercial content from non-commercial content. The context-based features are a function of single-side left and/or right neighborhoods of segments of the multiple segments.

42 Claims, 5 Drawing Sheets

U.S. PATENT DOCUMENTS

| | | |
|---|---|---|
| 6,466,702 B1 | 10/2002 | Atkins et al. |
| 6,622,134 B1 | 9/2003 | Sorkin |
| 6,643,665 B1 | 11/2003 | Kimbell et al. |
| 6,670,963 B1 | 12/2003 | Osberger |
| 6,714,909 B1* | 3/2004 | Gibbon et al. ............ 704/246 |
| 2002/0157116 A1 | 10/2002 | Jasinschi |
| 2002/0166123 A1 | 11/2002 | Schrader et al. |
| 2003/0033347 A1* | 2/2003 | Bolle et al. ............... 709/107 |
| 2003/0152363 A1 | 8/2003 | Jeannin et al. |
| 2003/0237053 A1 | 12/2003 | Chen et al. |
| 2004/0040041 A1 | 2/2004 | Crawford |
| 2004/0078357 A1 | 4/2004 | LaChapelle et al. |
| 2004/0078382 A1 | 4/2004 | Mercer et al. |
| 2004/0078383 A1 | 4/2004 | Mercer et al. |

OTHER PUBLICATIONS

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

Divakaran, A., Radhakrishnan, R., Peker, K. A.; "Video Summarization using Descriptors of Motion Activity: A Motion Activity Based Approach to Key-Frame Extraction from Video Shots" Journal of Electronic Imagin, SPIE + IS&T vol. 10, No. 4, Oct. 2001 pp. 909-916.

Fan, et al., "Visual Attention Based Image Browsing on Mobile Devices" 4 pages.

U.S. Appl. No. 10/371,125, filed Feb. 20, 2003; Inventors: Wei-Ying Ma et al., Entitled "Systems and Methods for Enhanced Image Adaptation".

U.S. Appl. No. 10/286,053, filed Nov. 1, 2002; Inventors; Yu-Fei Ma et al., Entitled "Systems and Methods for Generating a Comprehensive User Attention Model".

U.S. Appl. No. 10/286,348, filed Nov. 1, 2002; Inventors Xian-Sheng Hua et al. Entitled "Systems and Methods for Automatically Editing a Video".

U.S. Appl. No. 10/285,933, filed Nov. 1, 2002; Inventors Yu-Fei Ma et al.: Entitled "Systems and Methods for Generating a Motion Attention Mode".

Ahmad, Subutai; "VISIT: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous System, v.22 No. 3-4, Dec. 1997, pp. 329-344.

Chen et al.; "A Visual Attention Model for Adapting Images on Small Displays" ACM Multimedia Systems Journal, 2003.

Chen, Jinlin et al.; "Function-based Object Model Towards Website Adaptation" Proc. of the 10th Int. WWW Conf., 2001, pp. 1-21.

Cherry, Steven M.; "Pesky Home Networks Trouble Cable Behemoths" IEEE Spectrum, Apr. 2002, pp. 60-61.

Held, Gibert; "Focus on Agere System's Orinoco PC Card" International Journal of Network Management, May/Jun. 2002, pp. 187-193.

Jha, Uma S.; "Wireless Landscape-Need for Seamless Connectivity" Wireless Personal Communications 2002 pp. 275-283.

Christopoulos, Charilaos et al.; "The JPEG2000 Still Image Coding System: An Overview" IEEE Transactions on Consumer Electronics, vol. 46 No. 4, Nov. 2000, pp. 1103-1127.

Deng et al.; "Peer Group Filtering and Perceptual Color Image Quantization" Proceedings of IEEE International Symposium on Circuits and Systems, vol. 4, 1999, pp. 21-24.

Gamaz et al.; "Robust Scene-Change Detection in MPEG Compressed Domain" Elec & Comp. Eng., 1998, pp. 95-99.

Jing et al.; "An Effective Region-Based Image Retrieval Framework" From ACM Multimedia, 2002, 28 pages.

Li et al.; "Statistical Learning of Multi-View Face Detection" Proceedings of ECCV, 2002, 25 pages.

Milanese R. et al.; "Attentive Mechanisms for Dynamic and Static Scene Analysis" Optical Engineering, v34 No. 8, Aug. 1995, pp. 2428-2434.

Heng et al.; "Post Shot Boundary Detection Technique: Flashlight Scene Determination" University of Western Australia, 1999, pp. 447-450.

Itti et al.; "Computational Modelling of Visual Attention" Nature Reviews/Neuroscience, vol. 2, Mar. 2001, pp. 1-11.

Itti et al.; "A Comparison of Feature Combination Strategies for Saliceny-Based Visual Attention Systesm" Proc. of SPIE Human Vision and Electronic Imaging IV (HVEI'99), San Jose CA, vol. 3644, Jan. 1999., pp. 473-482.

Itti et al.; "A Model of Saliency-based Visual Attention for Rapid Scene Analysis" IEEE Trans. on Pattern Analysis and Machine Intelligence, 1998, 5 pages.

Lee, Keansub et al.; "Perception-Based Image Transcoding for Universal Multimedia Access" School of Electrical Engineering Korea University, Seoul Korea ,2001, IEEE, pp. 475-478.

O'Toole, Colin et al.; "Evaluation of Automatic Shot Boundary Detection on a Large Video Test Suite" School of Computer Applications & School of Electronic Engineering, Dublin City University, Glasnevin Dublin Ireland Challenge of Image Retrieval, Newcastle, 1999, pp. 1-12.

Lelescu et al.; "Real-time Scene Change Detection on Compressed Multimedia Bitstream Based on Statistical Sequential Analysis" IEEE, 2000, pp. 1141-1144.

O'Toole; "An MPEG-1 Shot Boundary Detector Using XIL Colour Histograms" Dublin City University, 1998, pp. 1-7.

T. Lin et al.; "Video Scene Extraction by Force Competition" IEEE Intl. Conference on Multimedia and Expo (ICME 001), Waseda University, Tokyo Japan, Aug. 2001, 4 pages.

Ma et al.; "A User Attention Model for Video Summarization" Proceedings of ICIP, 2002.

Yu-Fei Ma & Hong Jiang Zhang; "A Model of Motion Attention for Video Skimming" Microsoft Research, Asia, 4 pages.

Niebur, E. et al.; "Computational Architectures for Attention" The Attentive Brain, Chapter 9, 1998, pp. 163-186.

Sahoo P.K. et al.; "Threshold Selection Using a Minimal Histogram Entropy Difference" Optical Engineering, v36 No. 7, Jul. 1997, pp. 1976-1981.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" Al and the Eye, Chapter 4, 1990, pp. 79-103.

Zadeh L. A.; "Probability Measures of Fuzzy Events" Journal of Mathematical Analysis and Applications, 23, 1968, pp. 421-427.

M.A. Smith et al.; "Video Skimming and Characterization Through the Combination of Image and Language Understanding Techniques" Proc. of Computer Vision and Pattern Recognition, 1997, IEEE, pp. 775-781.

Yu-Fei Ma & Hong-Jiang Zhang; "A New Perceived Motion Based Shot Content Representation" Microsoft Research, China, 4 pages.

Gu et al.; "Dissolve Detection in MPEG Compressed Video" IEEE, 1997, pp. 1692-1696.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Goncalves, "Towards a Learning Model for Feature Integration in Attention Control", retrieved on Jul. 19, 2006 at <<http://ieeexplore.ieee.org/search/srchabstract.jsp?arnumber=1013553&isnumber=21824&pun>>, International Conference on Multisensor Fusion and Integration for Intelligent Systems, Aug. 20-22, 2001, pp. 311-316.

Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.

* cited by examiner

LEARNING-BASED AUTOMATIC COMMERCIAL CONTENT DETECTION

The invention pertains to image processing.

BACKGROUND

There are many objectives for detecting TV commercials. For example, companies who produce commercial advertisements (ads) generally charge other companies to verify that certain TV commercials are actually broadcast as contracted (e.g., broadcast at a specified level of quality for a specific amount of time, during a specific time slot, and so on). Companies who design ads typically research commercials to develop more influential advertisements. Thus, commercial detection techniques may also be desired to observe competitive advertising techniques or content.

Such commercial content verification/observation procedures are typically manually performed by a human being at scheduled broadcast time(s), or by searching (forwarding, rewinding, etc.) a record of a previous broadcast. As can be appreciated, waiting for a commercial to air (broadcast), setting up recording equipment to record a broadcast, and/or searching records of broadcast content to verify commercial content airing(s) can each be time consuming, laborious, and costly undertakings.

To make matters even worse, and in contrast to those that desire to view TV commercials, others may find commercial content aired during a program to be obtrusive, interfering with their preferred viewing preferences. That is, rather than desiring to view commercial content, such entities would rather not be presented with any commercial content at all. For example, a consumer may desire to record a TV program without recording commercials that are played during broadcast of the TV program. Unfortunately, unless a viewer actually watches a TV program in its entirety to manually turn on and off the recording device to selectively record non-commercial content, the viewer will typically not be able to record only non-commercial portions of the TV program.

In light of the above, whether the objective is to view/record commercial content or to avoid viewing/recording commercial content, existing techniques for commercial content detection to enable these goals are substantially limited in that they can be substantially time consuming, labor intensive, and/or largely ineffective across a considerable variety of broadcast genres. Techniques to overcome such limitations are greatly desired.

SUMMARY

Systems and methods for learning-based automatic commercial content detection are described. In one aspect, program data is divided into multiple segments. The segments are analyzed to determine visual, audio, and context-based feature sets that differentiate commercial content from non-commercial content. The context-based features are a function of single-side left and right neighborhoods of segments of the multiple segments.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
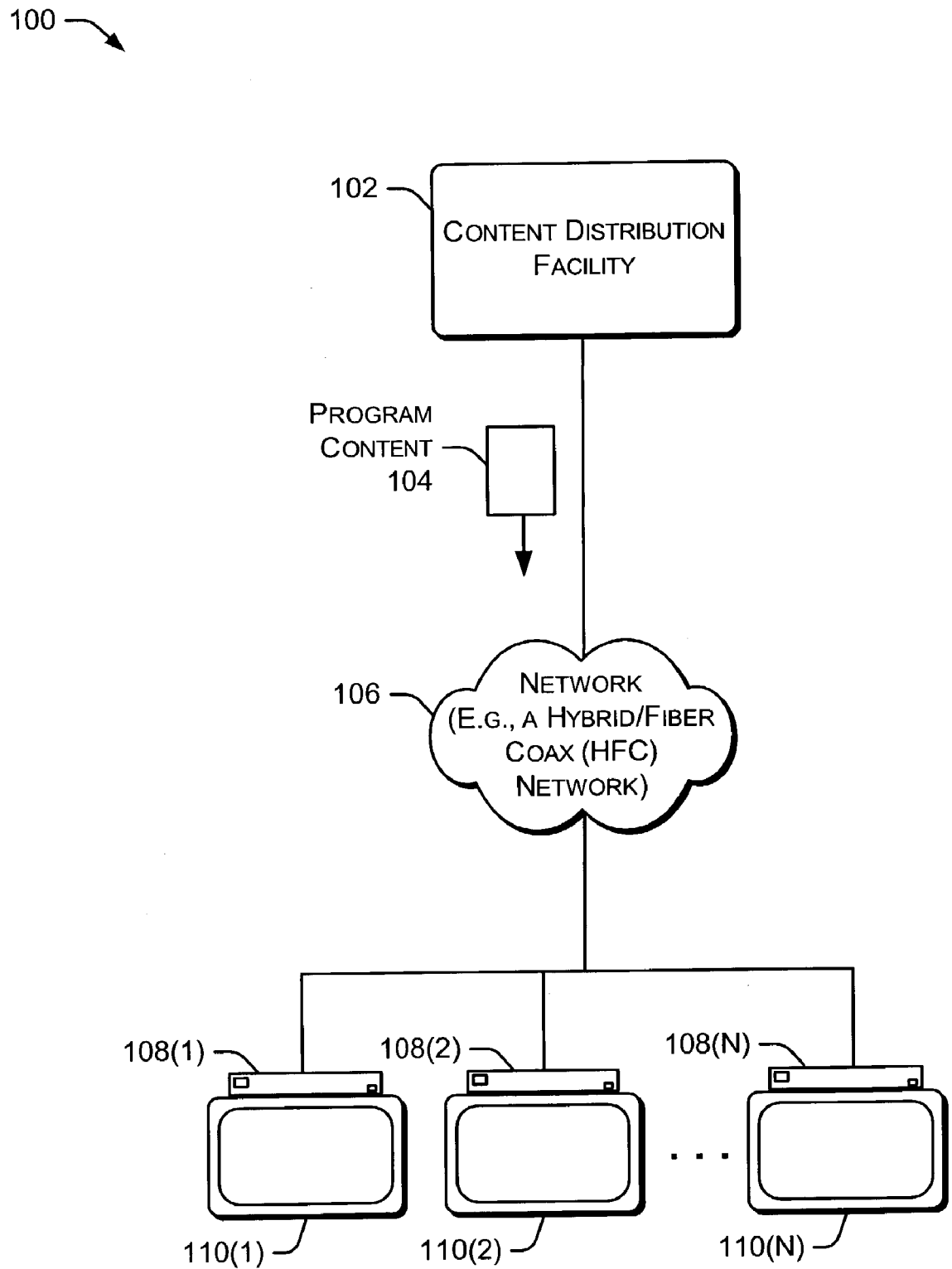
FIG. 1 shows an exemplary computing environment on which systems, apparatuses and methods for learning-based automatic commercial content detection may be implemented.

The following discussion is directed to systems and methods for learning-based automatic detection of commercial content in program data. Program data, for example, is data that is broadcast to clients in a television (TV) network such as in interactive TV networks, cable networks that utilize electronic program guides, Web-enabled TV networks, and so on. Program data may also be embodied as digital video and/or audio data that has been stored onto any of numerous different types of volatile or non-volatile data storage such as computer-readable media, tapes, CD-ROMs, diskettes, and so on. Numerous computing architectures such as in a set-top box, a digital program recorder, or a general purpose PC can be modified according to the following description to practice learning-based automatic detection of commercial content.

To this end, a commercial content classification model is trained using a kernel support vector machine (SVM). The model is trained with commercial content that represents any number of visual and/or audio genres. Techniques to generate SVM-based classification models are well known.

If the trained SVM model is not generated on the particular computing device that is to implement the learning-based automatic commercial content detection operations, the trained SVM model is manually or programmatically uploaded or downloaded to/from the particular computing device. For example, if the trained SVM model is posted to a Web site for download access, any number of client devices (e.g., set-top boxes, digital recorders, etc.) can download the trained model for subsequent installation. For purposes of this discussion, the particular computing device is a digital recorder that has either been manufactured to include the trained SVM model or downloaded and installed the trained SVM model, possibly as an update.

At this point and responsive to receiving program data, the digital recorder (DR) divides the program data into multiple segments using any of numerous segmenting or shot boundary determination techniques. In one implementation, the multiple segments may be the same as shots.

However, the segments, or segment boundaries are independent of shot boundaries and thus, do not necessarily represents shots. Rather, the segments are window/blocks of data that may or may not represent the boundaries of one or more respective shots. The DR analyzes the extracted segments with respect to multiple visual, audio, and context-based features to generate visual, audio, and context-based feature sets. The DR then evaluates the extracted segments in view of the trained SVM model to classify each of the extracted segments as commercial or non-commercial content. These classifications are performed in view of the visual, audio, and context-based feature sets that were generated from the extracted segments.

The DR then performs a number of post-processing techniques to provide additional robustness and certainty to the determined segment (e.g., shot) classifications. Such post-processing techniques include, for example, scene-grouping and merging to generate commercial and non-commercial blocks of content. As part of post-processing operations, these generated blocks are again evaluated based on multiple different threshold criteria to determine whether segments within blocks should reclassified, merged with a different block, and/or the like.

In this manner, the systems, apparatus, and methods for learning-based commercial content detection differentiate and organize commercial and non-commercial portions of program data. Since the differentiated portions have been aggregated into blocks of like-classified segments/scenes, an entity that desires to verify/observe only commercial portions may do so without experiencing time consuming, labor intensive, and/or potentially prohibitive expenses that are typically associated with existing techniques. Moreover, an entity that desires to view/record only non-commercial portions of program data may do so without watching a program in its entirety to manually turn on and off the recording device to selectively record only non-commercial content.

An Exemplary System

Turning to the drawings, wherein like reference numerals refer to like elements, the invention is illustrated as being implemented in an exemplary computing environment. The exemplary computing environment is only one example of a suitable computing environment and is not intended to suggest any limitation as to the scope of use or functionality of systems and methods the described herein. Neither should the exemplary computing environment be interpreted as having any dependency or requirement relating to any one or combination of components illustrated in the computing environment.

FIG. 1 shows exemplary computing environment 100 on which systems, apparatuses and methods for learning-based automatic commercial content detection may be implemented. The exemplary environment represents a television broadcast system that includes a content distributor 102 for broadcasting program data 104 across network 106 to one or more clients 108(1)–108(N). The program data is broadcast via "wireless cable", digital satellite communication, and/or other means. As used herein, program data refers to the type of broadcast data that includes commercial advertisements. The network includes any number and combination of terrestrial, satellite, and/or digital hybrid/fiber coax networks.

Clients 108(1) through 108(N) range from full-resource clients with substantial memory and processing resources (e.g., TV-enabled personal computers, multi-processor systems, TV recorders equipped with hard-disks) to low-resource clients with limited memory and/or processing resources (e.g., traditional set-top boxes, digital video recorders, and so on). Although not required, client operations for learning-based automatic commercial detection are described in the general context of computer-executable instructions, such as program modules stored in the memory and being executed by the one or more processors. Program modules generally include routines, programs, objects, components, data structures, etc., that perform particular tasks or implement particular abstract data types.

In one implementation, a client 108 (any one or more of clients 108(1) through 108(N)) is coupled to or incorporated into a respective television viewing device 110(1) through 110(N).

An Exemplary Client

Figure 2:
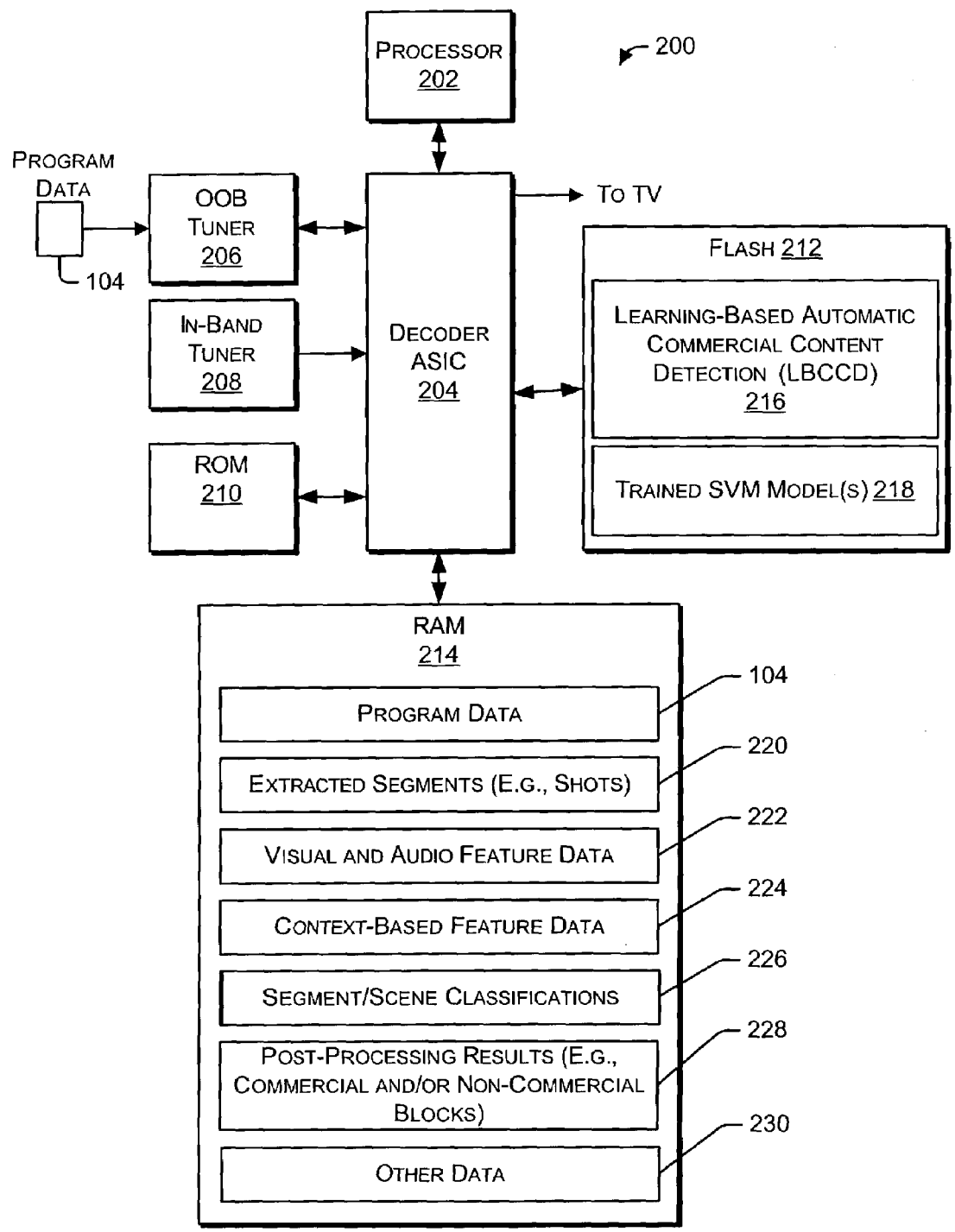
FIG. 2 is a block diagram of an exemplary client computing device that includes computer-readable media with computer-program instructions for execution by a processor to implement learning-based automatic commercial content detection.

FIG. 2 shows an exemplary client computing device (i.e., one of clients 108(1) through 108(N) of FIG. 1) that includes computer-readable media with computer-program instructions for execution by a processor to implement learning-based automatic commercial content detection. For purposes of discussion, the exemplary client is illustrated as a general-purpose computing device in the form of a set-top box 200. The client 200 includes a processor 202 coupled to a decoder ASIC (application specific integrated circuit) 204. In addition to decoder circuitry, ASIC 204 may also contain logic circuitry, bussing circuitry, and a video controller. The client 200 further includes an out-of-band (OOB) tuner 206 to tune to the broadcast channel over which the program data 104 is downloaded. One or more in-band tuners 208 are also provided to tune to various television signals. These signals are passed through the ASIC 204 for audio and video decoding and then to an output to a television set (e.g., one of TVs 110(1) through 110(N) of FIG. 1). With the tuners and ASIC 204, the client is equipped with hardware and/or software to receive and decode a broadcast video signal, such as an NTSC, PAL, SECAM or other TV system video signal and provide video data to the television set.

One or more memories are coupled to ASIC 204 to store software and data used to operate the client 200. In the illustrated implementation, the client has read-only memory (ROM) 210, flash memory 212, and random-access memory (RAM) 214. One or more programs may be stored in the ROM 210 or in the flash memory 212. For instance, ROM 210 stores an operating system (not shown) to provide a run-time environment for the client. Flash memory 212 stores a learning-based (LB) commercial detection program module 216 that is executed to detect commercial portions of the program data 104. Hereinafter, the LB automatic commercial content detection program module is often referred to as "LBCCD" 216. The LBCCD utilizes one or more trained SVM models 218, which are also stored in the flash memory 214, to assist in classifying portions of the program data 104 as commercial verses non-commercial.

RAM 214 stores data used and/or generated by the client 200 during execution of the LBCCD module 216. Such data includes, for example, program data 104, extracted segments 220, visual and audio feature data 222, context-based feature 224, segment/scene classifications 226, post processing results 228, and other data 230 (e.g., a compression table used to decompress the program data). Each of these program module and data components are now described in view if the exemplary operations of the LBCCD module 216.

To detect commercial portions of program data 104, the LBCCD module 216 first divides program data 104 into multiple segments (e.g., shots). These segments are represented as extracted segments 220. Segment extraction operations are accomplished using any of a number of known segmentation/shot extraction techniques such as those described in "A New Shot Detection Algorithm" D. Zhang, W. Qi, H. J. Zhang, 2nd IEEE Pacific-Rim Conference on Multimedia (PCM2001), pp. 63–70, Beijing, China, October 2001.

In another implementation, the LBCCD module 216 detects shot boundaries for program data shot extraction using techniques described in U.S. patent application Ser. No. 09/882,787, titled "A Method and Apparatus for Shot Detection", filed on Jun. 14, 2001, commonly assigned herewith, and which is hereby incorporated by reference.

Time-Based and Segment-based Visual Feature Analysis

The LBCCD module 216 analyzes each extracted segment 220 with respect to numerous visual and audio features to generate visual and audio feature data 222. Although the extracted segments can be evaluated in view of any number of visual and audio criteria, in this implementation, six (6) visual features and five (5) audio features are used to analyze the extracted segments. Two (2) of the visual features are time-based features, and four (4) of the visual features are segment-based features. The time-based visual features include, for example, shot frequency (SF) and black frame rate (BFR) of every second.

Each segment is evaluated with respect to the segment-based visual features, which include Average of Edge Change Ratio ("A-ECR"), Variance of Edge Change Ratio ("V-ECR"), Average of Frame Difference ("A-FD"), and Variance of Frame Difference ("V-FD"). Edge Change Ratio represents the amplitude of edge changes between two frames [6] as follows:

$$ECR_m = \max\left(\frac{X_m^{in}}{\sigma_m}, \frac{X_{m-1}^{out}}{\sigma_{m-1}}\right). \quad (1)$$

Variable $\sigma_m$ is the number of edge pixels in frame m, $X_m^{in}$ and $X_{m-1}^{out}$ are the number of entering and exiting edge pixels in frame m and m−1, respectively. A-ECR and V-ECR of segment C are defined as $$AECR(C) = \frac{1}{F-1}\sum_{m=1}^{F-1} ECR_m, \quad (2)$$

and $$VECR(C) = \frac{1}{F-1}\sum_{m=1}^{F-1} (ECR_m - AECR(C))^2, \quad (3)$$

where F is the number of frames in the segment.

Frame Difference (FD) is defined by $$FD_m = \frac{1}{P}\sum_{i=0}^{P-1}|F_i^m - F_i^{m-1}| \quad (4)$$

where P is the pixel number in one video frame, $F_i^m$ is the intensity value of pixel i of frame m, and A-FD and V-FD are obtained similarly to A-ECR and V-ECR.

Figure 3:
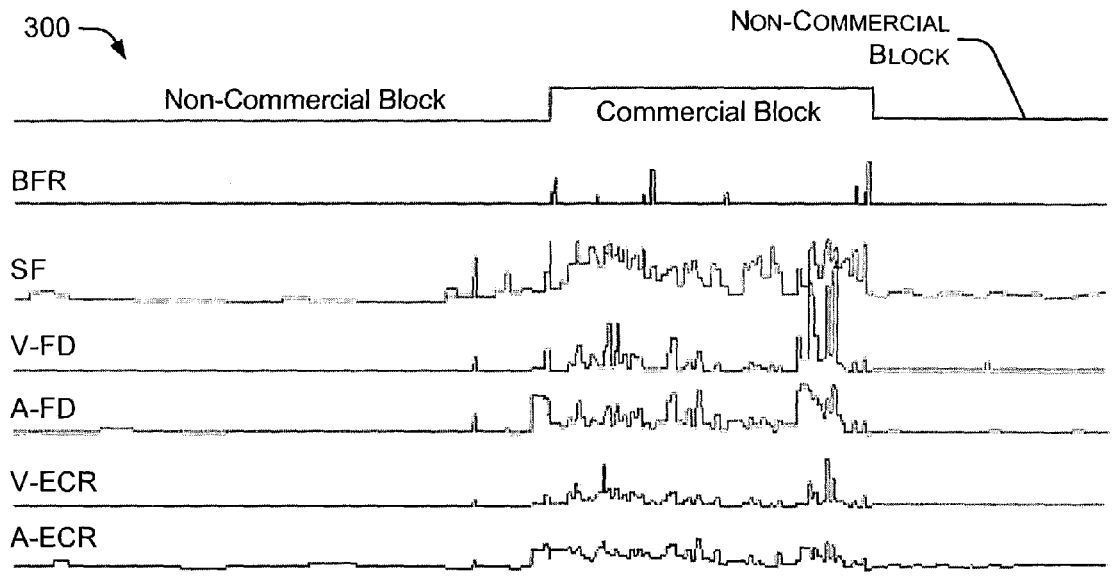
FIG. 3 shows results of an exemplary application of time and segment-based visual criteria to extracted segments of a digital data stream (program data such as a television program) to differentiate non-commercial content from commercial content.

FIG. 3 shows results of an exemplary application of time and segment-based visual criteria to extracted segments of a digital data stream (e.g., program data such as a television program) to differentiate non-commercial content from commercial content. In this example, the horizontal axis of the graph 300 represents the passage of time, and the vertical axis of the graph 300 represents the values of respective ones of the calculated visual features as a function of time. The illustrated visual feature values include calculated A-ECR, V-ECR, A-FD, V-FD, BFR, and SF results.

Figure 4:
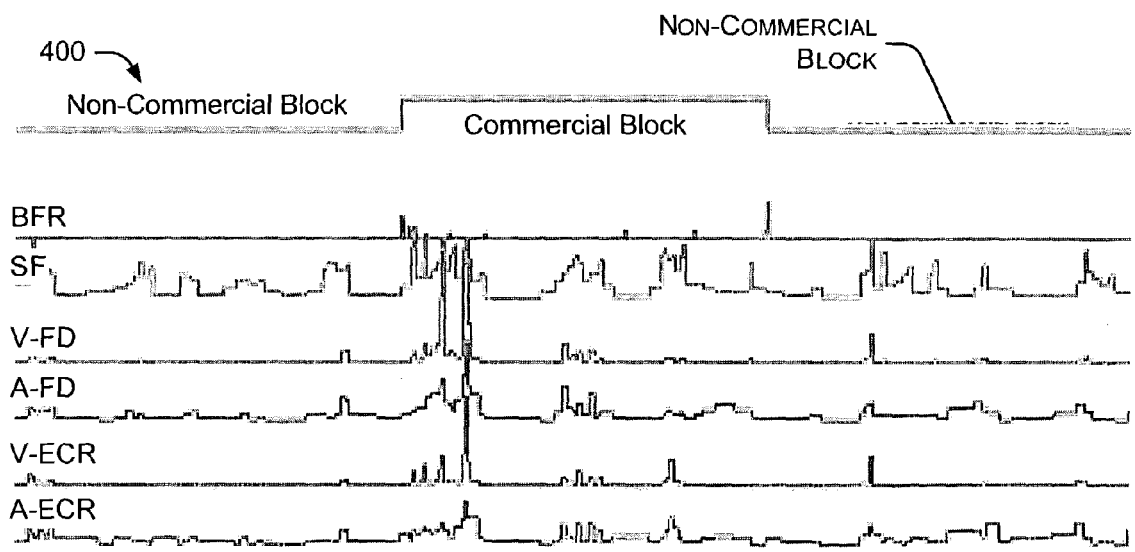
FIG. 4 shows results of an exemplary application of visual criteria to extracted segments of a digital data stream, wherein visual feature analysis by itself does not conclusively demarcate the commercial content from the non-commercial content.

As shown, the visual feature values of graph 300 clearly distinguish a commercial block of program data from a non-commercial block. However, how clearly such content can be differentiated across different portions of the program content using only such visual feature calculations is generally a function of the visual attributes of the program data at any point in time. Thus, depending on visual feature content of the program data, visual feature analysis by itself may not always be able to clearly demarcate commercial portions from non-commercial portions. An example of this is shown in FIG. 4, wherein visual feature analysis by itself does not conclusively demarcate the commercial content from the non-commercial content.

In light of this, and to add additional content differentiation robustness to LBCCD 216 (FIG. 2) algorithms, the LBCCD module further generated audio and context-based feature sets for each of the extracted segments 220 (FIG. 2). These additional feature sets provide more data points to verify against the trained SVM model(s) 218 (FIG. 2) as described below.

Audio Features

Referring to FIG. 2, the LBCCD module 216 further analyzes each of the extracted segments 220 (FIG. 2) with respect to audio break frequency and audio type. In this implementation, audio break frequency and audio type determinations are extracted from the segments at constant time intervals, for example, every 1⁄2 second. With respect to audio break detection, audio transitions are typically present between commercial and non-commercial or different commercial program data. Such audio breaks are detected as a function of speaker change, for example, as described in L. Lu, H. J. Zhang, H. Jiang, "Content Analysis for Audio Classification and Segmentation" IEEE Trans on Speech and Audio Processing, Vol. 10, No. 7, pp.504–516, October 2002, and which is incorporated by reference.

For instance, the LBCCD module 216 first divides the audio stream from the program data 104 into sub-segments delineated by a sliding-window. In one implementation, each sliding-window is three (3) seconds wide and overlaps any adjacent window(s) by two-and-one-half (2½) seconds. The LBCCD module further divides the sub-segments into non-overlapping frames. In one implementation, each non-overlapping frame is twenty-five (25) ms long. Other window and sub-segment sizes can be used and may be selected according to numerous criteria such as the genre of the program data, and so on. At this point, The LBCCD module 216 extracts Mel-frequency Cepstral Coefficient (MFCC) and short-time energy from each non-overlapping frame. K-L distance is used to measure the dissimilarity of MFCC and energy between every two sub-segments, $$D(i,j) = \frac{1}{2}tr[(C_i - C_j)(C_j^{-1} - C_i^{-1})] +$$
$$\frac{1}{2}tr[(C_i^{-1} + C_j^{-1})(u_i - u_j)(u_i - u_j)^T].$$

This is equation (5), wherein $C_i$ and $C_j$ are the estimated covariance matrices, $u_i$ and $u_j$ are the estimated mean vectors, from i-th and j-th sub-segment respectively; and $D(i, j)$ denote the distance between the i-th and j-th audio sub-segments.

Thus, an audio transition break is found between i-th and (i+1)-th sub-segments, if the following conditions are satisfied:

$$D(i,i+1) > D(i+1,i+2), D(i,i+1) > D(i-1,i), D(i,i+1) > Th_i \quad (5)$$

The first two conditions guarantee that a local dissimilarity peak exists, and the last condition can prevent very low peaks from being detected. $Th_i$ is a threshold, which is automatically set according to the previous N successive distances. That is:

$$Th_i = \alpha \cdot \frac{1}{N} \sum_{n=0}^{N} D(i-n-1, i-n) \quad (6)$$

wherein $\alpha$ is a coefficient amplifier.

With respect to audio type discrimination, existing techniques typically utilize only silence (e.g., see [2] in APPENDIX) to determine whether there may be a break between commercial and non-commercial content. Such existing techniques are substantially limited in other indicators other than lack of sound (silence) can be used to detect commercial content. For example, commercial content typically includes more background sound than other types of programming content. In light of this, and in contrast to existing techniques, the LBCCD module 216 utilizes audio criteria other than just silence to differentiate commercial content from non-commercial content.

In this implementation, the LBCCD module 216 utilizes four (4) audio types, speech, music, silence and background sound, to differentiate commercial portion(s) of program data 104 from non-commercial portion(s) of program data. The LBCCD module analyzes each of the extracted segments 220 as a function of these audio types using techniques, for example, as described in "A Robust Audio Classification and Segmentation Method," L. Lu, H. Jiang, H. J. Zhang, 9th ACM Multimedia, pp. 203–211, 2001, and/or "Content-based Audio Segmentation Using Support Vector Machines," L. Lu, Stan Li, H, J. Zhang, Proceedings of ICME 2001, pp. 956–959, Tokyo, Japan, 2001, both of which are hereby incorporated by reference (see, [8] and [9] in APPENDIX).

Based on such audio type analysis, the LBCCD module 216 calculates a respective confidence value for each audio type for each segment of the extracted segments 220. Each confidence value is equal to the ratio of the duration, if any, of a specific audio type in a particular sub-segment.

Context-Based Features

Without forehand knowledge of the content of a particular program, it is typically very difficult to view a program for only one or two seconds and based on that viewing, identify whether a commercial block or a non-commercial block was viewed. However, after watching some additional number of seconds or minutes, the viewed portion can typically be recognized as being commercial, non-commercial, or some combination of both (such as would be seen during a commercial/non-commercial transition).

The LBCCD module 216 takes advantage of the time-space relationship that enables one to identify context, wherein time is the amount of time that it takes to comprehend context, and wherein space is the amount of the program data 104 that is evaluated in that amount of time. In particular, the LBCCD module 216 identifies context-based information of a current segment from the current segment as well as from segments within single-sided neighborhoods of the current segment. Neighbor segments are other ones of the segments in extracted segments 220 that border the current segment at some distance to the left or right sides of the current segment. The size or distance of a neighborhood is a function of the ordinal number of the neighborhood.

Figure 5:
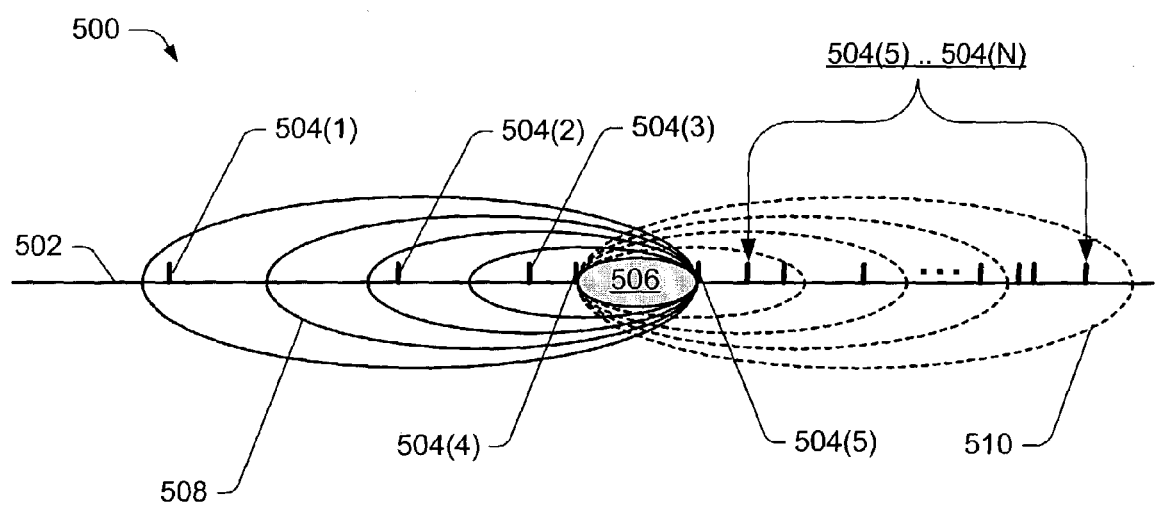
FIG. 5 is an exemplary diagram showing single-sided left and right "neighborhoods" of a current segment (e.g., shot) that is being evaluated to extract a context-based feature set.

FIG. 5 is an exemplary diagram 500 showing single-sided left and right "neighborhoods" of a current segment that is being evaluated to extract a context-based feature set. Horizontal axis 502 represents a sequence of program data 104 (FIGS. 1 and 2). Vertical tick marks 504(1) through 504(N) represent program data segment boundaries. Each adjacent tick mark pair represents a boundary of a particular segment. Although some numbers of segment boundaries are shown, the actual number of segment boundaries in the program data can be just about any number since it will typically be a function of program data content and the particular technique(s) used to segment the program data into respective segments.

For purposes of discussion, segment 506 (the shaded oval) is selected as an exemplary current segment. The current segment is one of the extracted segments 220 (FIG. 2). Segment boundaries 504(4) and 504(5) delineate the current segment. As the LBCCD module 216 (FIG. 2) evaluates program data (represented by the horizontal axis 502) to differentiate commercial from non-commercial content, each other segment in the program data is, at one time or another, designated to be a current segment to determine its context-based features.

Neighborhood(s) to the left of the right-most boundary of the exemplary current segment 506 are represented by solid line non-shaded ovals. For example, left neighborhood oval 508 encapsulates segment boundaries 504(2)–504(5). Neighborhood(s) to the right of the left-most boundary of the exemplary current segment are represented by dotted line non-shaded ovals. For example, right neighborhood oval 510 encapsulates segment boundaries 504(4)–504(N). As the respective left and right neighborhoods show, the LBCCD module 216 (FIG. 2) evaluates segments in "single side" neighborhoods, each of which extend either to the left or to the right of the current segment's boundaries.

A single-side neighborhood is not a two-side neighborhood. This means that a neighborhood does not extend both to the left and to the right of a current segment's boundaries. This single-side aspect of the neighborhoods reduces undesired "boundary effects" that may otherwise increase commercial/non-commercial classification errors at the boundaries of the extracted segments.

Referring to FIG. 2, the LBCCD module 216 generates context-based feature set 224 according to the following. Let $[s_i, e_i]$ denote the start and end frame number of current segment $C_i$. $[s_i, e_i]$ also represents start and end times (in seconds) of the segment (time-based features are a function of time). The (2n+1) neighborhoods include left n neighborhoods, right n neighborhoods, and the current segment $C_i$, are determined as follows:

$$N^k = [N_s^k, N_e^k] = \begin{cases} [\min(e_i + \alpha k, 0), e_i] & k < 0 \\ [s_i, e_i] & k = 0 \\ [s_i, \min(s_i + \alpha k, L)] & k > 0. \end{cases} \quad (7)$$

The variable L is the length or total frame number of the TV program, and $k \in Z$, $|k| \leq n$, Z is the set of integers, $\alpha$ is the time step of the neighborhoods. In one implementation, n=6, and $\beta$=5.

Let $S^k$ represent the set of all segments that are partially or totally included in $N^k$, that is $$S^k = \{C_j^k : 0 \leq j < M^k\} = \{C_i : C_i \cap N^k \neq \Phi\} \quad (8)$$

where $M^k$ is the number of segments in $S^k$, i and j are non-negative integers.

Derived context-feature set 224 is the average value of basic features on $S^k$ (for segment-based features) or $N^k$ (for time-based features). For example, A-ECR on $S^k$ and BFR on $N^k$ are obtained by $$AECR_{S^k} = \frac{1}{\sum_{j=0}^{M^k-1}(e_j^k - s_j^k)} \sum_{j=0}^{M^k-1}(e_j^k - s_j^k) AECR(C_j^k), \quad (9)$$

and $$BFR_{N^k} = \frac{1}{N_e^k - N_s^k} \sum_{j=N_s^k}^{N_s^k-1} BFR(j), \quad (10)$$

where $[e_j^k, s_j^k]$ is the start and end frame number of segment $C_j^k$. BFR(j) represents the black frame rate in [j,j+1] (count by second). Also, $AECR_{S^k}$ is not equal to the average ECR in $[N_s^k, N_e^k]$.

Thus, ECR is not counted between two consecutive segments.

Using these techniques and in this implementation, the LBCCD model 216 generates 11×(2n+1) context-based features 224 from the above eleven (11) described visual and audio features. Accordingly, in this implementation, the context-based feature set represents a one-hundred-and-forty-three (143) dimensional feature for each extracted segment 220.

SVM-Based Classification

To further classify individual ones of the extracted segments 220 as consisting of commercial or non-commercial content, the LBCCD module 216 utilizes a Support Vector Machine (SVM) to classify every segment represented in the context-based feature set 224 as commercial or non-commercial. To this end, a kernel SVM is used to train at least one SVM model 218 for commercial segments. For a segment $C_j$, we denote the SVM classification output as Cls($C_j$); Cls($C_j$)$\geq$0 indicates that $C_j$ is a commercial segment. Although techniques to train SVM classification models are known, for purposes of discussion an overview of learning by kernel SVM follows.

Consider the problem of separating a set of training vectors belonging to two separate classes, $(x_1; y_1), \ldots, (x_1; y_1)$, where $x_i \in R^n$ is a feature vector and $y_i \in \{-1,+1\}$ is a class label, with a separating hyper-plane of equation $w \cdot x + b = 0$. Of all the boundaries determined by w and b, the one that maximizes the margin will generalize better than other possible separating hyper-planes.

A canonical hyper-plane [10] has the constraint for parameters w and b: $\min_{x_i} y_i[(w \cdot x_i) + b] = 1$. A separating hyper-plane in canonical form must satisfy the following constraints, $y_i[(w \cdot x_i) + b] \geq 1$, i=1, ... l. The margin is $$\frac{2}{\|w\|}$$

according to its definition. Hence the hyper-plane that optimally separates the data is the one that minimizes $$\phi(w) = \frac{1}{2}\|w\|^2.$$

The solution to the optimization problem is given by the saddle point of the Lagrange functional, $$L(w, b, \alpha) = \frac{1}{2}\|w\|^2 - \sum_{i=1}^{l} \alpha_i \{y_i[(w \cdot x_i) + b] - 1\} \quad (11)$$

with Lagrange multipliers $\alpha_i$. The solution is given by, $$\overline{w} = \sum_{i=1}^{l} \overline{\alpha}_i y_i x_i, \quad \overline{b} = -\frac{1}{2}\overline{w} \cdot [x_r + x_s] \quad (12)$$

wherein $x_r$ and $x_s$ are support vectors which belong to class +1 and −1, respectively.

In linearly non-separable but nonlinearly separable case, the SVM replaces the inner product $x \cdot y$ by a kernel function K(x; y), and then constructs an optimal separating hyper-plane in the mapped space. According to the Mercer theorem [10], the kernel function implicitly maps the input vectors into a high dimensional feature space. This provides a way to address the difficulties of dimensionality [10].

Possible choices of kernel functions include: (a) Polynomial K(x,y)=$(x \cdot y+1)^d$, where the parameter d is the degree of the polynomial; (b) Gaussian Radial Basis (GRB) Function:

$$K(x, y) = \exp\left(-\frac{\|x-y\|^2}{2\sigma^2}\right),$$

where the parameter $\sigma$ is the width of the Gaussian function; (c) Multi-Layer perception function: K(x,y)=tanh($\kappa(x \cdot y) - \mu$), where the $\kappa$ and $\mu$ are the scale and offset parameters. In our method, we use the GRB kernel, because it was empirically observed to perform better than other two.

For a given kernel function, the classifier is given by the following equation:

$$f(x) = \text{sgn}\left(\sum_{i=1}^{l} \overline{\alpha}_i y_i K(x_i, x) + \overline{b}\right) \quad (13)$$

Results of the described SVM classification are represented in FIG. 2 as segment/scene classifications 226.

Post-Processing Operations

LBCCD module 216 of FIG. 2 utilizes a number of post-processing operations to increase the accuracy of the SVM-based classification results described above. In particular, scene-grouping techniques are utilized to further refine the LBCCD algorithms. Scene-grouping techniques are applied, at least in part, on an observation that there is typically a substantial similarity in such visual and audio features as color and audio type within commercial blocks, as well as within non-commercial blocks. In light of this, the LBCCD module combines segments into scenes by the method proposed in reference [11], wherein each scene includes all commercial segments or all non-commercial segments. Consecutive commercial scenes and consecutive non-commercial scenes are merged to form a series of commercial blocks and non-commercial blocks.

For instance, let $$Shot = \{C_0, C_1, \wedge, C_{N-1}\}, N: \text{ number of all shots}, \quad (14)$$

$$Scene = \{S_0, S_1, \wedge, S_{M-1}\}, M: \text{ number of all scenes, and}$$

$$S_k = \{C_0^k, C_1^k, \wedge, C_{N_k-1}^k\}, \sum_{k=0}^{M-1} N_k = N,$$

represent all segments of program data 104 (e.g., a TV program) and the scene-grouping results. This scene-grouping algorithm incorporates techniques described in [11], which is hereby incorporated by reference. In particular, refinement of commercial detection by scene-grouping can then be described as scene classification and merging, wherein each scene is classified based on the following rule:

$$Cls(S_k) = \text{sign}\left(\sum_{j=0}^{N_k-1} \text{sign}(Cls(C_j^k))\right) \quad (15)$$

The variable sign(x) is a sign function which returns one (1) when $x \geq 0$ and negative-one (-1) when $x < 0$. This rule indicates that if the number of commercial segments in $S_k$ is not less than half of $N_k$, this scene is classified as a commercial scene; otherwise, the scene is classified as a non-commercial scene.

At this point, a number of initial commercial and non-commercial blocks have been so classified. For purposes of discussion, these initial results are represented as an intermediate form of post processing results 228 of FIG. 2, or as other data 230. Also, for purposes of discussion, these initial blocks are still referred to as commercial scenes and non-commercial scenes. To provide further robustness to these scene-grouping results, the LBCCD module 216 of FIG. 2 evaluates the content of the scene groups as a function one or more configurable threshold values. Based on these evaluations, the LBCCD determines whether the initial scene grouping results (and possibly subsequent iterative scene grouping results) should be further refined to better differentiate commercial from non-commercial content.

In particular, and in this implementation, four (4) configurable thresholds are employed by the LBCCD module 216 (FIG. 2) to remove/reconfigure relatively short scenes, double check long commercial scenes for embedded non-commercial content, detect long commercial portions of a non-commercial scene, and refine the boundaries of commercial and non-commercial segments. Application of these criteria may result in scene splitting operations, whereupon for each split operation, properties for the affected scenes are recalculated using equation (15), followed by a merging operation as discussed above.

With respect to criteria to remove short scenes, a scene is considered to be too short if it is smaller than a configurable threshold $T_1$. If a scene meets this criterion, the scene is merged into the shorter scene of its two neighbor scenes.

With respect to double checking long commercial scenes, a commercial is not typically very long with respect to the amount of time that it is presented to an audience. Thus, if a commercial scene is longer than a configurable threshold $T_2$, the scene is evaluated to determine if it may include one or more non-commercial portion(s). To this end, the LBCCD module 216 determines whether an improperly merged scene or segment (e.g., shot) grouping lies in a boundary between two segments $C_i$ and $C_{i+1}$, according to the following:

$$Cls(C_i) \cdot Cls(C_{i+1}) < 0 \quad (16)$$

$$|Cls(C_i) - Cls(C_{i+1})| > T_2 \quad (17).$$

If these two constraints are satisfied at the same time, the LBCCD module splits the long commercial scene between $C_i$ and $C_{i+1}$. These split scenes are reclassified according to equation (15), followed by a merging operation as discussed above.

With respect to separating a commercial part from a long non-commercial scene, it has been observed that there may be one or more consecutive commercial segments in a long non-commercial scene. To separate any commercial segments from the non-commercial scene in such a situation, the scene is split at the beginning and end of this commercial part, if the number of the consecutive commercial segments is larger than a threshold $T_c$. Consecutive commercial segments in a long non-commercial scene are detected by counting the number of consecutive segments that are classified as commercial segments by the aforementioned SVM classification approach. If the number is greater than a configurable threshold, this set of the consecutive segments are regarded as consecutive commercial segments in this long non-commercial scene.

With respect to refining scene boundaries, it is a user-preference rule. If the user wants to keep all non-commercial (commercial) segments, several segments in the beginning and end of each commercial (non-commercial) scene are checked. If a segment $C_j$ of this kind is too long (short) and $$Cls(C_j)$$

is smaller (bigger) than a configurable threshold $T_3$, the segment is merged/transferred to its closest corresponding non-commercial (commercial) scene.

The client 200 has been described with respect to architectural aspects of a set-top box but may have also been described as a different computing device such as a digital video recorder, a general purpose computing device such as a PC, and so on. Moreover, the client 200 may further include other components, which are not shown for simplicity purposes. For instance, the client may be equipped with hardware and/or software to present a graphical user interface to a viewer, by which the viewer can navigate an electronic program guide (EPG), or (if enabled) to access various Internet system network services, browse the Web, or send email. Other possible components might include a network connection (e.g., modem, ISDN modem, etc.) to provide connection to a network, an IR interface, display, power resources, etc. A remote control may further be provided to allow the user to control the client.

Exemplary Procedure

Figure 6:
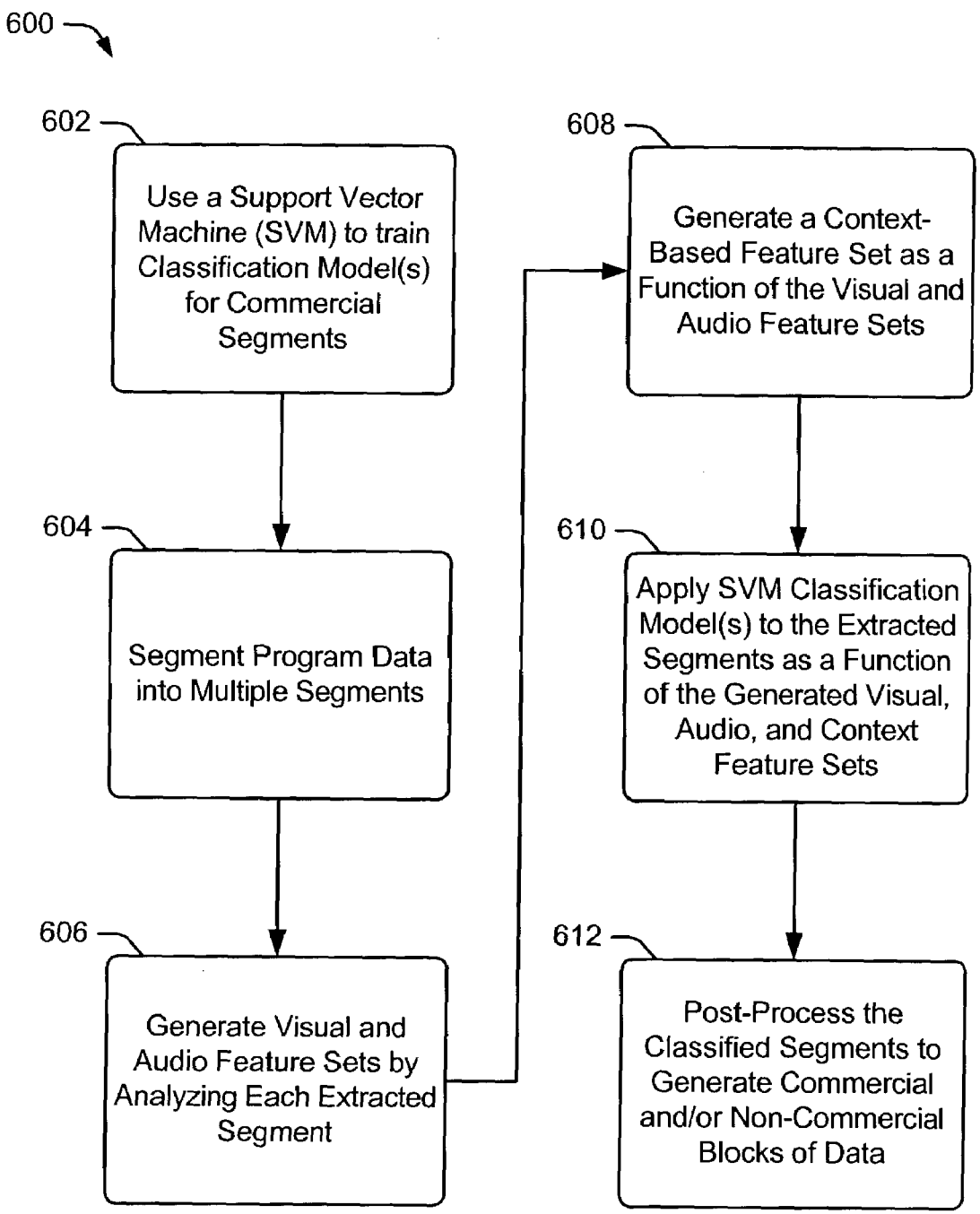
FIG. 6 shows an exemplary procedure for implementing learning-based automatic commercial content detection.

FIG. 6 shows an exemplary procedure for implementing learning-based automatic commercial content detection. For purposes of discussion, the operations of the procedure are described in reference to various program module and data components of FIGS. 1 and 2. At block 602, a kernel SVM is used to train one or more SVM classification model(s) for classifying commercial segments. These one or more trained models are represented as trained SVM models 218 (FIG. 2). At block 604, the learning-based (LB) commercial detection module 216 (FIG. 2) segments program data 104 (FIGS. 1 and 2) into multiple segments. Such segments are represented as extracted segments 220 (FIG. 2). At block 606, the LBCCD module analyzes segment-based and time-based visual features as well as audio features of the extracted segments. This analysis generates the visual and audio feature data 222 (FIG. 2). At block 608, the results of visual and audio feature analysis are further refined by determining contextual aspects of the segments. Such contextual aspects are represented as context-based feature data 224 (FIG. 2).

At block 610, the LBCCD module 216 (FIG. 2) applies the trained SVM classification models (see, block 602) to the extracted segments 220 (FIG. 2) in view of the visual and audio feature data 222 and the context-based feature data 224. This operation results in each of the extracted segments being classified as commercial or non-commercial. These results are represented as segment/scene classifications 226 (FIG. 2). At block 612, the LBCCD module performs a number of post-processing operations to further characterize the segment/scene classifications as being commercial or non-commercial in content. Such post processing operations include, for example, scene-grouping, merging, and application of multiple heuristic criteria to further refine the SVM classifications.

In this manner, the LBCCD module 216 (FIG. 2) identifies which portions of program data 104 (FIGS. 1 and 2) consist of commercial/advertising as compared to non-commercial/general programming content. Segregated commercial and/or non-commercial blocks resulting from these post-processing operations are represented as post-processing results 228 (FIG. 2).

CONCLUSION

The described systems and methods provide for learning-based automatic commercial content detection. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

APPENDIX—REFERENCES

[1] R. Lienhart, et al. "On the Detection and Recognition of Television Commercials," Proc of IEEE Conf on Multimedia Computing and Systems, Ottawa, Canada, pp. 609–516, June 1997.

[2] D. Sadlier, et al, "Automatic TV Advertisement Detection from MPEG Bitstream," Intl Conf on Enterprise Information Systems, Setubal, Portugal, 7–10 Jul. 2001.

[3] T. Hargrove, "Logo Detection in Digital Video," http://toonarchive.com/logo-detection/, March 2001.

[4] R. Wetzel, et al, "NOMAD," http://www.fatalfx.com/nomad/, 1998.

[5] J. M. Sánchez, X. Binefa. "AudiCom: a Video Analysis System for Auditing Commercial Broadcasts," Proc of ICMCS'99, vol. 2, pp. 272–276, Firenze, Italy, June 1999.

[6] R. Zabih, J. Miller, K. Mai, "A Feature-Based Algorithm for Detecting and Classifying Scene Breaks," Proc of ACM Multimedia 95, San Francisco, Calif., pp. 189–200, November 1995.

[7] L. Lu, H. J. Zhang, H. Jiang, "Audio Content Analysis for Video Structure Extraction," Submitted to IEEE Trans on SAP.

[8] L. Lu, H. Jiang, H. J. Zhang. "A Robust Audio Classification and Segmentation Method," 9th ACM Multimedia, pp. 203–211, 2001.

[9] L. Lu, Stan Li, H, J. Zhang, "Content-based Audio Segmentation Using Support Vector Machines," Proc of ICME 2001, pp. 956–959, Tokyo, Japan, 2001

[10] V. N. Vapnik, "Statistical Learning Theory", John Wiley & Sons, New York, 1998.

[11] X. Y. Lu, Y. F. Ma, H. J. Zhang, L. D. Wu, "A New Approach of Semantic Video Segmentation," Submitted to ICME2002, Lausanne, Switzerland, August 2002.

The invention claimed is:

1. A method for learning-based automatic commercial content detection, the method comprising:

dividing program data into multiple segments;

analyzing the segments to determine visual, audio, and context-based feature sets that differentiate commercial content from non-commercial content; and wherein the context-based features are a function of one or more single-side left and/or right neighborhoods of segments of the multiple segments; and wherein the single-side left and/or right neighborhoods are (2n+1) neighborhoods of a current segment $C_i$, and wherein the method further comprises:

calculating each of the (2n+1) neighborhoods as follows:

$$N^k = [N_s^k, N_e^k] = \begin{cases} [\min(e_j + \alpha k, 0), e_i] & k < 0 \\ [s_i, e_i] & k = 0 \\ [s_i, \min(s_i + \alpha k, L)] & k > 0, \end{cases}$$

wherein $N^k$ represents 2n+1, n representing a number of neighborhoods left and/or right of $C_i$, $[s_i, e_i]$ denoting start and end frame numbers for $C_i$ and start and end times for $C_i$, $N_s^k$ represents a start frame number for $N^k$, $N_e^k$ represents an end frame number for $N^k$, L indicating a length of the program data, $k \in Z, |k| \leq n$, and $\alpha$ a comprising a time step.

2. The method of claim 1, wherein the visual feature set comprises segment-based features and time-based features.

3. The method of claim 1, wherein the visual feature set is a function of average of edge change ratio, variance of edge change ratio, average of frame difference, variance of frame difference, shot frequency, and/or black frame rate.

4. The method as of claim 1, wherein the audio feature set is determined as a function of one or more of speech, music, silence, background sound and audio break frequency.

5. The method of claim 1, wherein the method further comprises classifying each of the multiple segments as being commercial or non-commercial content as a function of a trained commercial content classification model, and the visual, audio, and context-based feature sets.

6. The method of claim 5, wherein classifying further comprises:
training a Support Vector machine (SVM) classification model with commercial content; and
wherein the trained commercial content classification model comprises the SVM classification model.

7. The method of claim 1, wherein the method further comprises:
classifying each of the multiple segments as being commercial or non-commercial content as a function of a trained commercial content classification model, and the visual, audio, and context-based feature sets; and
post-processing classified commercial and/or non-commercial segments to generate commercial and/or non-commercial blocks, each block comprising one or more segments of the multiple segments.

8. The method of claim 7, wherein post-processing further comprises:
grouping segments into scenes; and
merging scenes into the commercial and/or non-commercial blocks.

9. The method of claim 8, wherein post-processing further comprises evaluating features of the commercial and/or non-commercial blocks to remove short scenes, remove embedded non-commercial content from long commercial scenes, detect long commercial portions in a non-commercial scene, and/or refine the boundaries of commercial and non-commercial scenes and/or segments.

10. The method of claim 8, wherein post-processing further comprises: responsive to applying the one or more heuristic criteria to remove shod scenes, remove embedded non-commercial content from long commercial scenes, detect long commercial portions in a non-commercial scene, and/or refine the boundaries of commercial and non-commercial scenes, re-grouping the segments into scenes, and re-merging scenes into the commercial and/or non-commercial blocks.

11. A method for learning-based automatic commercial content detection, the method comprising:
dividing program data into multiple segments;
analyzing the segments to determine visual, audio, and context-based feature sets that differentiate commercial content from non-commercial content, the context-based features being a function of one or more single-side left and/or right neighborhoods of segments of the multiple segments, the analyzing comprising further:
a calculating the context-based feature sets from segment-based visual features as an average value of visual features of $S^k$, $S^k$ representing a set of all segments of the multiple segments that are partially or totally included in the single-side left and/or right neighborhoods such that $S^k=\{C_j^k:0\leq j<M^k\}=\{C_i:C_i\cap N^k\neq\Phi\}$, $M^k$ being a number of segments in $S^k$, and wherein $N^k$ represents 2n+1 neighborhoods, n represents a number of neighborhoods left and/or right of a current segment $C_i$, $S^k$ is a set of segments that are partially or totally included in $N^k$, $C^k_j$ represents is a j-th element of $S^k$, $M^k$ represents a total number of elements in $S^k$, and $\Phi$ represents an empty set.

12. A computer-readable medium for learning-based automatic commercial content detection, the computer-readable medium comprising computer-program executable instructions executable by a processor for:
dividing program data into multiple segments;
analyzing the segments to determine visual, audio, and context-based feature sets that differentiate commercial content from non-commercial content, the context-based features being a function of one or more single-side left and/or right neighborhoods of segments of the multiple segments; and
calculating the context-based feature sets from segment-based visual features as an average value of visual features of $S^k$, $S^k$ representing a set of all segments of the multiple segments that are partially or totally included in the single-side left and/or right neighborhoods such that $S^k=\{C_j^k:0\leq j<M^k\}=\{C_i:C_i\cap N^k\neq\Phi\}$, $M^k$ being a number of segments in $S^k$, and
wherein $N^k$ represents 2n+1 neighborhoods, n represents a number of neighborhoods left and/or right of a current segment $C_i$, $S^k$ is a set of segments that are partially or totally included in $N^k$, $C^k_j$ represents is a j-th element of $S^k$, $M^k$ represents a total number of elements in $S^k$, and $\Phi$ represents an empty set.

13. The computer-readable medium of claim 12, wherein the visual feature set comprises segment-based features and time-based features.

14. The computer-readable medium of claim 12, wherein the visual feature set is a function of average of edge change ratio, variance of edge change ratio, average of frame difference, variance of frame difference, shot frequency, and/or black frame rate.

15. The computer-readable medium of claim 12, wherein the audio feature set is determined as a function of one or more of speech, music, silence, background sound and audio break frequency.

16. The computer-readable medium of claim 12, wherein the computer-program instructions further comprise instructions for classifying each of the multiple segments as being commercial or non-commercial content as a function of a trained commercial content classification model, and the visual, audio, and context-based feature sets.

17. The computer-readable medium of claim 16, wherein the computer-program instructions for classifying further comprise instructions for:
training a Support Vector machine (SVM) classification model with commercial content; and
wherein the trained commercial content classification model comprises the SVM classification model.

18. The computer-readable medium of claim 12, wherein the computer-program instructions further comprise instructions for:
classifying each of the multiple segments as being commercial or non-commercial content as a function of a trained commercial content classification model, and the visual, audio, and context-based feature sets; and
post-processing classified commercial and/or non-commercial segments to generate commercial and/or non-commercial blocks, each block comprising one or more segments of the multiple segments.

19. The computer-readable medium of claim 18, wherein the computer-program instructions for post-processing further comprise instructions for:
grouping segments into scenes; and merging scenes into the commercial and/or non-commercial blocks.

20. The computer-readable medium of claim 19, wherein post-processing farther comprises:
determining whether to apply one or more heuristic criteria to remove short scenes, double check long commercial scenes, detect long commercial portions of a non-commercial scene, and/or refine the boundaries of commercial and non-commercial scenes; and
responsive to applying the one or more heuristic criteria, re-grouping the segments into scenes, and re-merging scenes into the commercial and/or non-commercial blocks.

21. A computer-readable medium for learning-based automatic commercial content detection, the computer-readable medium comprising computer-program executable instructions executable by a processor for:
dividing program data into multiple segments;
analyzing the segments to determine visual, audio, and context-based feature sets that differentiate commercial content from non-commercial content the context-based features being a function of one or more single-side left and/or right neighborhoods of segments of the multiple segments, the single-side left and/or right neighborhoods are (2n+1) neighborhoods of a current segment C; and
calculating each of the (2n+1) neighborhoods as follows:

$$N^k = [N_s^k, N_e^k] = \begin{cases} [\min(e_j + \alpha k, 0), e_i] & k < 0 \\ [s_i, e_i] & k = 0 \\ [s_i, \min(s_i + \alpha k, L)] & k > 0, \end{cases}$$

wherein $N^k$ represents $2n+1$, n representing a number of neighborhoods left and/or right of $C_i$, $[s_i, e_i]$ denoting start and end frame numbers for $C_i$ and start and end times for $C_i$, $N_s^k$ represents a start frame number for $N^k$, $N_e^k$ represents an end frame number for $N^k$, L indicating a length of the program data, $k \in Z, |k| \leq n$, and $\alpha$ comprising a time step.

22. A computing device for learning-based automatic commercial content detection, the computing device comprising:
a processor; and
a memory coupled to the processor, the memory comprising computer-program executable instructions executable by the processor for:
dividing program data into multiple segments;
analyzing the segments to determine visual, audio, and context-based feature sets that differentiate commercial content from non-commercial content, the context-based features being a function of one or more single-side left and/or right neighborhoods of segments of the multiple segments; and
wherein the single-side left and/or right neighborhoods are (2n+1) neighborhoods of a current segment $C_i$, and wherein the computer-program instructions farther comprise instructions for:
calculating each of the (2n+1) neighborhoods as follows:

$$N^k = [N_s^k, N_e^k] = \begin{cases} [\min(e_j + \alpha k, 0), e_i] & k < 0 \\ [s_i, e_i] & k = 0 \\ [s_i, \min(s_i + \alpha k, L)] & k > 0, \end{cases}$$

wherein $N^k$ represents $2n+1$, n representing a number of neighborhoods left and/or right of $C_i$, $[s_i, e_i]$ denoting start and end frame numbers for $C_i$ and start and end times for $C_i$, $N_s^k$ represents a start frame number for $N^k$, $N_e^k$ represents an end frame number for $N^k$, L indicating a length of the program data, $k \in Z, |k| \leq n$, and $\alpha$ comprising a time step.

23. The computing device of claim 22, wherein the visual feature set comprises segment-based features and time-based features.

24. The computing device of claim 22, wherein the visual feature set is a function of average of edge change ratio, variance of edge change ratio, average of frame difference, variance of frame difference, shot frequency, and/or black frame rate.

25. The computing device of claim 22, wherein the audio feature set is determined as a function of one or more of speech, music, silence, background sound, and audio break frequency.

26. The computing device of claim 22, wherein the computer-program instructions further comprise instructions for classifying each of the multiple segments as being commercial or non-commercial content as a function of a trained commercial content classification model, and the visual, audio, and context-based feature sets.

27. The computing device of claim 26, wherein the computer-program instructions for classifying further comprise instructions for:
training a Support Vector machine (SVM) classification model with commercial content; and
wherein the trained commercial content classification model comprises the SVM classification model.

28. The computing device of claim 22, wherein the computer-program instructions further comprise instructions for:
classifying each of the multiple segments as being commercial or non-commercial content as a function of a trained commercial content classification model, and the visual, audio, and context-based feature sets; and
post-processing classified commercial and/or non-commercial segments to generate commercial and/or non-commercial blocks, each block comprising one or more segments of the multiple segments.

29. The computing device of claim 28, wherein the computer-program instructions for post-processing further comprise instructions for:
grouping segments into scenes; and
merging scenes into the commercial and/or non-commercial blocks.

30. The computing device of claim 29, wherein post-processing further comprises:
determining whether to apply one or more heuristic criteria to remove short scenes, double check tong commercial scenes, detect long commercial portions of a non-commercial scene, and/or refine the boundaries of commercial and non-commercial scenes; and
responsive to applying the one or more heuristic criteria, re-grouping the segments into scenes, and re-merging scenes into the commercial and/or non-commercial blocks.

31. A computing device for learning-based automatic commercial content detection, the computing device comprising:
a processor; and
a memory coupled to the processor, the memory comprising computer-program executable instructions executable by the processor for:
dividing program data into multiple segments;

analyzing the segments to determine visual, audio, and context-based feature sets that differentiate commercial content from non-commercial content, the context-based features being a function of one or more single-side left and/or right neighborhoods of segments of the multiple segments, the analyzing comprising:

calculating context-based feature sets from segment-based visual features as an average value of visual features of $S^k$, $S^k$ representing a set of all segments of the multiple segments that are partially or totally included in the single-side left and/or right neighborhoods such that $S^k=\{C_j^k:0\leq j<M^k\}=\{C_i: C_i\cap N^k\neq\Phi\}$, $M^k$ being a number of segments in $S^k$, and wherein $N^k$ represents 2n+1 neighborhoods, n represents a number of neighborhoods left and/or right of a current segment $C_i$, $S^k$ is a set of segments that are partially or totally included in $N^k$, $C_j^k$ represents is a j-th element of $S^k$, $M^k$ represents a total number of elements in $S^k$, and $\Phi$ represents an empty set.

32. A computing device for learning-based automatic commercial content detection, the computing device comprising:

means for dividing program data into multiple segments;

means for analyzing the segments to determine visual, audio, and context-based feature sets that differentiate commercial content from non-commercial content; and wherein the context-based features are a function of one or more single-side left and/or right neighborhoods of segments of the multiple segments, the single-side left and/or right neighborhoods being (2n+1) neighborhoods of a current segment C; and wherein the computing device further comprises:

means for calculating each of the (2n+1) neighborhoods as follows:

$$N^k = [N_s^k, N_e^k] = \begin{cases} [\min(e_j + \alpha k, 0), e_i] & k < 0 \\ [s_i, e_i] & k = 0 \\ [s_i, \min(s_i + \alpha k, L)] & k > 0, \end{cases}$$

wherein n represents a number of neighborhoods left and/or right of $C_i$, $[s_i, e_i]$ denoting start and end frame numbers for $C_i$ and start and end times for $C_i$, $N_s^k$ denotes a staff frame number of $N^k$, $N_e^k$ denotes an end frame number of $N^k$, L indicates a length of the program data, $k\in Z, |k|\leq n$, and $\alpha$ comprises a time step.

33. The computing device of claim 32, wherein the computing device is a set-top box, a digital video recorder, or a general purpose computing device.

34. The computing device of claim 32, wherein the visual feature set comprises segment-based features and time-based features.

35. The computing device of claim 32, wherein the visual feature set is a function of average of edge change ratio, variance of edge change ratio, average of frame difference, variance of frame difference, shot frequency, and/or black frame rate.

36. The computing device of claim 32, wherein the audio feature set is determined as a function of one or more of speech, music, silence, background sound and audio break frequency.

37. The computing device of claim 32, wherein the computing device further comprises means for classifying each of the multiple segments as being commercial or non-commercial content as a function of a trained commercial content classification model, and the visual, audio, and context-based feature sets.

38. A computing device as recited in claim 37, wherein the means for classifying further comprise:

means for training a Support Vector machine (SVM) classification model with commercial content; and wherein the trained commercial content classification model comprises the SVM classification model.

39. The computing device of claim 32, wherein the computing device further comprises:

means for classifying each of the multiple segments as being commercial or non-commercial content as a function of a trained commercial content classification model, and the visual, audio, and context-based feature sets; and means for post-processing classified commercial and/or non-commercial segments to generate commercial and/or non-commercial blocks, each block comprising one or more segments of the multiple segments.

40. The computing device of claim 39, wherein the means for post-processing further comprise:

means for grouping segments into scenes; and means for merging scenes into the commercial and/or non-commercial blocks.

41. The computing device of claim 39, wherein the means for post-processing further comprises:

means for determining whether to apply one or more heuristic criteria to remove short scenes, double check long commercial scenes, detect long commercial portions of a non-commercial scene, and/or refine the boundaries of commercial and non-commercial scenes; and responsive to applying the one or more heuristic criteria, means for re-grouping the segments into scenes, and re-merging scenes into the commercial and/or non-commercial blocks.

42. A computing device for learning-based automatic commercial content detection, the computing device comprising:

means for dividing program data into multiple segments;

means for analyzing the segments to determine visual, audio, and context-based feature sets that differentiate commercial content from non-commercial content, the context-based features being a function of one or more single-side left and/or right neighborhoods of segments of the multiple segments;

means for calculating the context-based feature sets from segment-based visual features as an average value of visual features of $S^k$, $S^k$ representing a set of all segments of the multiple segments that are partially or totally included in the single-side left and/or right neighborhoods such that $S^k=\{C_j^k:0\leq j<M^k\}=\{C_i: C_i\cap N^k\neq\Phi\}$, $M^k$ being a number of segments in $S^k$, and wherein $N^k$ represents 2n+1 neighborhoods, n represents a number of neighborhoods left and/or right of a current segment $C_i$, $S^k$ is a set of segments that are partially or totally included in $N^k$, $C_j^k$ represents is a j-th element of $S^k$, $M^k$ represents a total number of elements in $S^k$, and $\Phi$ represents an empty set.

* * * * *